US012049057B2

(12) United States Patent
Burke

(10) Patent No.: US 12,049,057 B2
(45) Date of Patent: Jul. 30, 2024

(54) APPARATUSES AND METHODS FOR MANUFACTURING PACKAGING RECEPTACLES AND RECEPTACLES THEREOF

(71) Applicant: Wesley Jay Lawrence Burke, Beaverton, OR (US)

(72) Inventor: Wesley Jay Lawrence Burke, Beaverton, OR (US)

( * ) Notice: Subject to any disclaimer, the term of this patent is extended or adjusted under 35 U.S.C. 154(b) by 0 days.

(21) Appl. No.: 18/297,202

(22) Filed: Apr. 7, 2023

(65) Prior Publication Data

US 2023/0321941 A1 Oct. 12, 2023

Related U.S. Application Data

(60) Provisional application No. 63/328,277, filed on Apr. 7, 2022.

(51) Int. Cl.
*B31B 70/88* (2017.01)
*B31B 70/16* (2017.01)
(Continued)

(52) U.S. Cl.
CPC .............. *B31B 70/88* (2017.08); *B31B 70/16* (2017.08); *B31B 70/26* (2017.08); *B31B 70/64* (2017.08); *B31B 70/79* (2017.08)

(58) Field of Classification Search
CPC ....... B29C 65/18; B29C 66/71; B29C 51/225; B29C 66/112; B29C 51/14; B32B 3/28; B32B 38/06; B32B 7/12; B32B 27/00; B32B 27/32; B32B 29/005; B31B 50/88; B31B 70/88; B31B 2100/0022; B31B 2110/30; B31B 2120/40; B31B 2120/70; B31B 50/146; B31B 50/16
(Continued)

(56) References Cited

U.S. PATENT DOCUMENTS 2,942,301 A 6/1960 Price et al.
9,315,289 B2 4/2016 Nakamura et al.
(Continued)

FOREIGN PATENT DOCUMENTS

KR 102005092 B1 10/2019

*Primary Examiner* — Jacob A Smith
(74) *Attorney, Agent, or Firm* — Evergreen Valley Law Group; Kanika Radhakrishnan

(57) ABSTRACT

Embodiments of the present invention disclose packaging receptacles, modular apparatuses for manufacturing such packaging receptacles, and a method thereof. A modular apparatus for manufacturing packaging receptacles includes a paper feeder module, an embossing module, and an adhesive coating module. The paper feeder module includes a plurality of paper feeder rollers configured to feed one or more first layers of paper to the embossing module, and a second layer of paper to the adhesive coating module. The embossing module includes a first embossing roller and a second embossing roller configured to emboss a plurality of impressions onto the one or more first layers, and feed the embossed one or more first layers to the adhesive coating module. Also, the adhesive coating module is configured to apply an adhesive to an outermost surface of the embossed one or more first layers and an inner surface of the second layer.

20 Claims, 12 Drawing Sheets

(51) Int. Cl.

| | |
|---|---|
| ***B31B 70/26*** | (2017.01) |
| ***B31B 70/64*** | (2017.01) |
| ***B31B 70/74*** | (2017.01) |

(58) Field of Classification Search

USPC .......................................................... 493/186

See application file for complete search history.

(56) References Cited

U.S. PATENT DOCUMENTS

| | | | |
|---|---|---|---|
| 10,370,136 | B1 | 8/2019 | Linnell et al. |
| 2004/0065402 | A1* | 4/2004 | Knoerzer ................ B32B 38/06 156/209 |
| 2006/0278330 | A1* | 12/2006 | Kim ...................... B29C 48/001 156/243 |
| 2019/0225356 | A1* | 7/2019 | Persson ................... B65B 3/025 |
| 2020/0270048 | A1* | 8/2020 | Goodrich .................. B31F 1/07 |

* cited by examiner

APPARATUSES AND METHODS FOR MANUFACTURING PACKAGING RECEPTACLES AND RECEPTACLES THEREOF

TECHNICAL FIELD

The present invention generally relates to receptacles used for logistical applications, and, more particularly, the present invention relates to cushioned packaging receptacles, modular apparatuses for manufacturing cushioned packaging receptacles, and methods of manufacturing cushioned packaging receptacles.

BACKGROUND ART

Packaging receptacles, for example, mailer envelopes, are often used to send letters, documentation, and other items from one place to another. Often such documents may be of significant importance for the sender and/or the receiver of such documents. However, as the mailer envelopes change several hands and are picked and dropped, from and at different locations, respectively, they are subjected to a significant amount of wear and tear. Therefore, the documents are exposed to environmental elements such as dust, water, and other degrading factors. Moreover, often the packaging receptacles, including the mailer envelopes, are used to move fragile items, such as memory disks, medicines, glassware, etc. from one place to another, through mail or hand-to-hand transfer, etc.

Therefore, to prevent the contents of such receptacles from being damaged by external factors, some of the receptacles are made from materials using polymers in some form or shape. For example, the receptacles may be made from a sheet of polyethylene-coated kraft paper or an opaque sheet of polyethylene itself. Moreover, the receptacles may be provided with cushion linings on top of the polymer-based sheets to make the receptacles impact resistant. The cushion linings are generally made from cast extrusion of a vacuum-formed air bubble layer of polyethylene backed by one or two flat sealing layers also made up of polyethylene. However, the use of polyethylene and other polymers makes the receptacles non-biodegradable, and the use of dissimilar materials degrades their recyclability. Moreover, the apparatuses used for making such receptacles are very design and/or material-specific and therefore do not allow changeover from one set of constituent materials to another set of constituent materials, or one set of process steps to another set of process steps. Whereas the multi-processability of the apparatus is critical for saving capital and operational costs involved in switchovers between constituent materials. Also, any solution thus presented would also be required to be able to be retrofitted to existing apparatuses for a wide-scale acceptance of the solution. Therefore, there is a technical need in the art for solutions that do not suffer from the aforementioned deficiencies.

SUMMARY OF THE INVENTION

According to an aspect of the present invention, there is provided a modular apparatus for manufacturing packaging receptacles, that includes singularly specific modules to produce paper cushion-based receptacles only.

In one aspect of the invention, the modular apparatus includes a paper feeder module, an embossing module, and an adhesive coating module. The paper feeder module includes a plurality of paper feeder rollers configured to feed one or more first layers of paper to the embossing module and a second layer of paper to the adhesive coating module. The embossing module includes a first embossing roller and a second embossing roller. The embossing module is configured to emboss a plurality of impressions onto the one or more first layers by passing the one or more first layers between the first embossing roller and the second embossing roller, and feed the embossed one or more first layers to the adhesive coating module. Also, the adhesive coating module is configured to apply an adhesive to an outermost surface of the embossed one or more first layers and an inner surface of the second layer.

In one aspect of the invention, the first embossing roller includes a plurality of protrusions, and the second embossing roller includes a plurality of cavities complementary to the plurality of respective protrusions.

In one aspect of the invention, shapes of the plurality of protrusions and the plurality of cavities are selected from a group consisting of a square, a hexagon, a triangle, and an oval. The oval shape produces a bubble-like embossing, or a horizontal or a vertical continuous dome along a length of the first embossing roller, or along a circumference of the first embossing roller. The bubble-like embossing or the continuous dome may further be adapted to be received in complementary cavities of the second embossing roller, thereby producing a corrugated-like embossing onto the one or more first layers.

In one aspect of the invention, respective heights of the plurality of protrusions lie between 0.5 mm and 11 mm.

In one aspect of the invention, a height of each one of the plurality of protrusions is about 3 mm.

In one aspect of the invention, the plurality of protrusions is provided in any one of a longitudinal direction along the length of the first embossing roller and a transverse direction along the circumference of the first embossing roller.

In one aspect of the invention, the modular apparatus further includes a layer-sealing module, a folding module, a heated compression module, and a cutting module. The layer-sealing module includes a plurality of sealing implements configured to seal the embossed one or more first layers with the second layer, thereby generating a layer of a first packaging material. The folding module includes a plurality of folding implements configured to fold the layer of the first packaging material into a plurality of continuous predefined receptacles. The heated compression module includes a plurality of heated bars configured to thermally seal a plurality of folded surfaces of the plurality of continuous predefined receptacles. Also, the cutting module is configured to cut the plurality of continuous predefined receptacles into a plurality of respective individual predefined receptacles of a plurality of respective predefined sizes.

According to another aspect of the present invention, there is provided a multipurpose modular apparatus for manufacturing packaging receptacles. The multipurpose apparatus may include modules that produce typical polymer bubble-polymer coated paper receptacles and polymer bubble-opaque polymer layer receptacles in addition to modules to process paper cushion receptacles.

In one aspect of the invention, The multipurpose modular apparatus includes a first feeder module, a polymer cushion feeder module, and a heat-sealing module. The first feeder module includes a plurality of first feeder rollers configured to feed one or more layers of a polymer-based material to the heat-sealing module. The polymer cushion feeder module includes at least one polymer cushion material roller configured to feed a layer of a polymer cushion material to the heat-sealing module. Also, the heat-sealing module includes a heated-sealing roller set configured to thermally seal the one or more layers of the polymer-based material with the layer of the polymer cushion material by fusing an outermost surface of the one or more layers of the polymer-based material with an inner surface of the layer of the polymer cushion material.

In one aspect of the invention, the polymer-based material is selected from a group consisting of opaque coextruded polymer materials, typical extrusion polymers and polymer-coated paper materials.

In one aspect of the invention, the multipurpose modular apparatus further includes a paper feeder module, an embossing module, an adhesive coating module, and a layer-sealing module. The paper feeder module includes a plurality of paper feeder rollers, the plurality of paper feeder rollers configured to feed one or more first layers of paper to the embossing module, and a second layer of paper to the adhesive coating module. The embossing module includes a first embossing roller and a second embossing roller. The embossing module is configured to emboss a plurality of impressions onto the one or more first layers by passing the one or more first layers between the first embossing roller and the second embossing roller, and feed the embossed one or more first layers to the adhesive coating module. The adhesive coating module is configured to apply an adhesive to an outermost surface of the embossed one or more first layers and an inner surface of the second layer. Also, the layer-sealing module includes a plurality of sealing implements configured to seal the embossed one or more first layers with the second layer, thereby generating a layer of a first packaging material.

In one aspect of the invention, the multipurpose modular apparatus further includes a layer-sealing module, a folding module, a heated compression module, and a cutting module. The layer-sealing module includes a plurality of sealing implements configured to seal the one or more layers of polymer-based material with the layer of the polymer cushion material, thereby generating a layer of a second packaging material. The folding module includes a plurality of folding implements configured to fold the layer of the second packaging material into a plurality of continuous predefined receptacles. The heated compression module includes a plurality of heated bars configured to thermally seal a plurality of folded surfaces of the plurality of continuous predefined receptacles. Also, the cutting module is configured to cut the plurality of continuous predefined receptacles into a plurality of respective individual predefined receptacles of a plurality of respective predefined sizes.

According to another aspect of the present invention, there is provided a multipurpose modular apparatus for manufacturing packaging receptacles. The multipurpose modular apparatus includes a first feeder module, a polymer cushion feeder module, a heat-sealing module, a paper feeder module, an embossing module, an adhesive coating module, a layer-sealing module, a folding module, a heated compression module, and a cutting module. The first feeder module includes a plurality of first feeder rollers configured to feed one or more layers of a polymer-based material to the heat-sealing module. The polymer cushion feeder module includes at least one polymer cushion material roller configured to feed a layer of a polymer cushion material to the heat-sealing module. The heat-sealing module includes a heated-sealing roller set configured to thermally seal the one or more layers of the polymer-based material with the layer of the polymer cushion material by fusing an outermost surface of the one or more layers of the polymer-based material with an inner surface of the layer of the polymer cushion material. The paper feeder module includes a plurality of paper feeder rollers, the plurality of paper feeder rollers configured to feed one or more first layers of paper to the embossing module, and a second layer of paper to the adhesive coating module. The embossing module includes a first embossing roller and a second embossing roller, the embossing module configured to emboss a plurality of impressions onto the one or more first layers by passing the one or more first layers between the first embossing roller and the second embossing roller, and feed the embossed one or more first layers to the adhesive coating module. The adhesive coating module is configured to apply an adhesive to an outermost surface of the embossed one or more first layers and an inner surface of the second layer. The layer-sealing module includes a plurality of sealing implements configured to seal the embossed one or more first layers with the second layer, thereby generating a layer of a first packaging material, and seal the one or more layers of polymer-based material with the layer of the polymer cushion material, thereby generating a layer of a second packaging material. The folding module includes a plurality of folding implements configured to fold the layer of the first packaging material and the layer of the second packaging material into a plurality of continuous predefined receptacles. The heated compression module includes a plurality of heated bars configured to thermally seal a plurality of folded surfaces of the plurality of continuous predefined receptacles. Also, the cutting module is configured to cut the plurality of continuous predefined receptacles into a plurality of respective individual predefined receptacles of a plurality of respective predefined sizes.

According to another aspect of the present invention, there is provided a method of manufacturing packaging receptacles. The method includes feeding, by a plurality of paper feeder rollers of a paper feeder module, one or more first layers of paper to an embossing module, and a second layer of paper to an adhesive coating module. Further, the method includes embossing, by a first embossing roller and a second embossing roller of the embossing module, a plurality of impressions onto the one or more first layers, by passing the one or more first layers between the first embossing roller and the second embossing roller, and feeding the embossed one or more first layer to the adhesive coating module. Also, the method includes applying, by the adhesive coating module, an adhesive to an outermost surface of the embossed one or more first layers, and an inner surface of the second layer.

In one aspect of the invention, the adhesive is selected from a group consisting of water-based adhesives, hot-melt adhesives, and cold-seal adhesives.

In one aspect of the invention, a technique for the application of the adhesive is selected from a group consisting of spot application, line application, laid down application, and full coverage application through spraying.

In one aspect of the invention, the method further includes sealing, by a plurality of sealing implements of a layer-sealing module, the embossed one or more first layers with the second layer, thereby generating a layer of a first packaging material. The method further includes folding, by a plurality of folding implements of a folding module, the layer of the first packaging material into a plurality of continuous predefined receptacles. The method further includes sealing, thermally, by a plurality of heated bars of a heated compression module, a plurality of folded surfaces of the plurality of continuous predefined receptacles. Also, the method includes cutting, by a cutting module, the plurality of continuous predefined receptacles into a plurality of respective individual predefined receptacles of a plurality of respective predefined sizes.

According to another aspect of the invention, there is provided a method for manufacturing packaging receptacles. The method includes feeding, by a plurality of first feeder rollers of a first feeder module, one or more layers of a polymer-based material to a heat-sealing module. The method further includes feeding, by at least one polymer cushion material roller of a polymer cushion feeder module, a layer of a polymer cushion material to the heat-sealing module. Also, the method includes sealing, by a heated-sealing roller set of the heat-sealing module, the one or more layers of the polymer-based material with the layer of the polymer cushion material, by fusing an outermost surface of the one or more layers of the polymer-based material with an inner surface of the layer of the polymer cushion material.

In one aspect of the invention, the method further includes sealing, by a plurality of sealing implements of a layer-sealing module, the one or more layers of polymer-based material with the layer of the polymer cushion material, thereby generating a layer of a second packaging material. Further, the method includes folding, by a plurality of folding implements of a folding module, the layer of the second packaging material into a plurality of continuous predefined receptacles. The method further includes sealing, thermally, by a plurality of heated bars of a heated compression module, a plurality of folded surfaces of the plurality of continuous predefined receptacles. Also, the method includes cutting, by a cutting module, the plurality of continuous predefined receptacles into a plurality of respective individual predefined receptacles of a plurality of respective predefined sizes.

According to another aspect of the invention, there is provided a layer of a packaging material. The layer includes one or more first layers of paper with a plurality of impressions embossed thereupon, and a second layer of paper. Further, an outermost surface of the embossed one or more first layers is sealed with an inner surface of the second layer, through a thermal curing of an adhesive applied between the outermost surface of the embossed one or more first layers, and the inner surface of the second layer.

In one aspect of the invention, a plurality of respective heights of the plurality of impressions lies between 0.5 mm and 11 mm.

The present invention as summarized above offers several technical effects and advantages. In one aspect of the invention, a plurality of products can be produced because of the modular design of the apparatuses. Further, during the changeover from one conventional process to another process where the paper cushion layer receptacle would be manufactured, the heat sealing module, used in the processing of the typical polymer cushion-polymer coated paper outer layer product, is simply turned off. Whereas, in the case of the process where the polymer bubble-polymer coated paper is being processed simply the paper embossing module is bypassed and the adhesive coating module is turned off. Another aspect of the invention provides flexibility in production of multiple products in a single processing machine. In another aspect of the invention, the typical polymer cushion-polymer coated paper/opaque polymer sheet based receptacles apparatus is retrofitted to an existing machine adding multi-use and processing capabilities to produce paper cushion receptacles.

BRIEF DESCRIPTION OF THE DRAWINGS

The following detailed description of illustrative embodiments is better understood when read in conjunction with the appended drawings. To illustrate the present disclosure, example constructions of the disclosure are shown in the drawings. However, the present disclosure is not limited to a specific device, or a tool and instrumentalities disclosed herein. Moreover, those in the art will understand that the drawings are not to scale.

DETAILED DESCRIPTION

Figure 1:
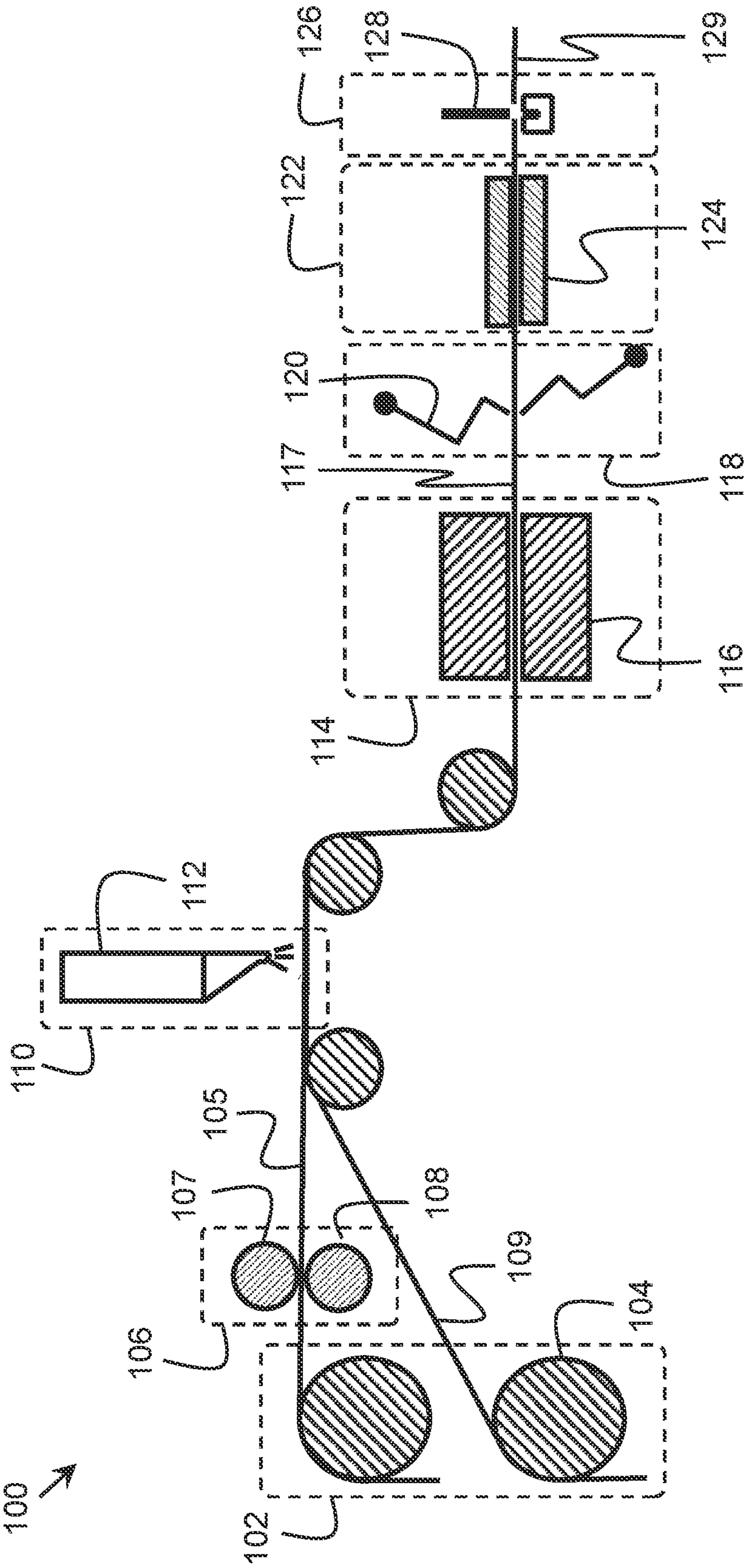
FIG. 1 illustrates a schematic diagram of a modular apparatus for manufacturing packaging receptacles, in accordance with an embodiment of the present invention.

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted to not unnecessarily obscure the embodiments herein. The examples used herein are intended merely to facilitate an understanding of ways in which the embodiments herein may be practiced and to further enable those of skill in the art to practice the embodiments herein.

Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Various embodiments of the present invention provide packaging receptacles, modular apparatuses for manufacturing the packaging receptacles, and methods of manufacturing the packaging receptacles. In several embodiments of the invention, the packaging receptacles may be envisaged to be constructed purely from paper, such as kraft paper. In that regard, the packaging receptacles may be made from a material having a cushion layer and an outer layer. The cushion layer may be made by embossing predetermined impressions on one or more layers of paper by passing the one or more layers of paper between embossing rollers. The cushion layer may be adhesively bonded to an outer layer also made from one or two layers of paper. The resulting material may then be formed into packaging receptacles of different shapes.

The modular apparatus for manufacturing the packaging receptacles may be designed for handling several distinct kinds of constituent materials and several distinct sets of process steps. For example, the modular apparatus may be a single-purpose apparatus designed to manufacture receptacles made from a material using paper for both the cushion layer and the outer layer. In another example, the modular apparatus may be a dual-purpose apparatus. The dual-purpose apparatus may be designed to manufacture receptacles made from a material using a polymer for the cushion layer, and polymer-coated paper for the outer layer, in a first mode of operation. The same dual-purpose modular apparatus may also be designed to manufacture the receptacles made from a material using a polymer for the cushion layer and an opaque polymer sheet for the outer layer, in a second mode of operation. In another example, the modular apparatus may be a triple-purpose apparatus, and in addition to the first and the second modes of operations, may also be designed for a third mode of operation, where the apparatus is designed to manufacture the receptacles made from the material using paper for both the cushion layer and the outer layer.

In that regard, the modular apparatus may be provided with several modules including a plurality of feeder modules including feeding rollers for feeding different kinds of raw materials such as opaque polymer sheets, polymer bubble sheets, and paper sheets. Further, the modular apparatus may include an embossing module including embossing rollers for generating the cushion layer from one or more layers of the paper. The modular apparatus may also include an adhesive coating module for depositing adhesive(s) onto the cushion layer and the outer layer, which are made from paper. A heat-sealing module may be common to the first and the second modes of operation and may be used for bonding the cushion layer with the outer layer through fusion. A layer-sealing module may be common to all the three modes, viz., the first, the second, and the third modes of operation. The layer-sealing module may be configured to seal the cushion layer with the outer layer forming a layer of a packaging material. A folding module may be provided for forming the layer of packaging material into a continuous string of receptacles of desired shapes and forms. The apparatus may further include a heated compression module to lock and seal folded surfaces of the receptacles through heat. A cutting module may include blades and other implements to cut the continuous string of receptacles into individual receptacles of predefined sizes.

Various example embodiments of the present invention are described hereinafter with reference to FIGS. 1 to 8A-8D.

FIG. 1 illustrates a schematic diagram of a modular apparatus 100 for manufacturing packaging receptacles, in accordance with an embodiment of the present invention. The modular apparatus 100 includes a paper feeder module 102, an embossing module 106, and an adhesive coating module 110. The aforementioned modules of the modular apparatus 100, viz. the paper feeder module 102, the embossing module 106, the adhesive coating module 110, and other additional modules which will be described in the following discussion, may be powered by a common prime mover or distinct groups of prime movers. In several embodiments of the invention, the prime mover(s) may include electrical motors, such as Alternating Current (AC) motors and Direct Current (DC) motors. The paper feeder module 102 includes a plurality of paper feeder rollers 104. The plurality of paper feeder rollers 104 is configured to feed one or more first layers 105 of paper to the embossing module 106. Further, the plurality of paper feeder rollers 104 is configured to feed a second layer 109 of paper to the adhesive coating module 110. The paper grade of the one or more first layers 105 and the second layer 109 may be selected from a group consisting of Clay Coated News Board (CCNB), Folding Box Board (FBB), Solid Bleached Sulfate Board (SBS), Natural kraft or Coated Unbleached Kraft (SUS or CUK), Greyboard (CCNB Paperboard), Ford Paper, Ivory Paper, Couche Paper, Bristol Paper, Duplex Paper, Decal Paper, etc. In several embodiments of the invention, the one or more first layers 105 and the second layer 109 may be made up of kraft paper. The kraft paper may include virgin kraft paper, recycled brown craft paper, white bleached kraft paper, and yellow-golden kraft paper.

The embossing module 106 includes a first embossing roller 107 and a second embossing roller 108. The embossing module 106 is configured to emboss a predefined pattern onto the one or more first layers 105, by passing the one or more first layers 105 between the first embossing roller 107 and the second embossing roller 108.

Figure 2A:
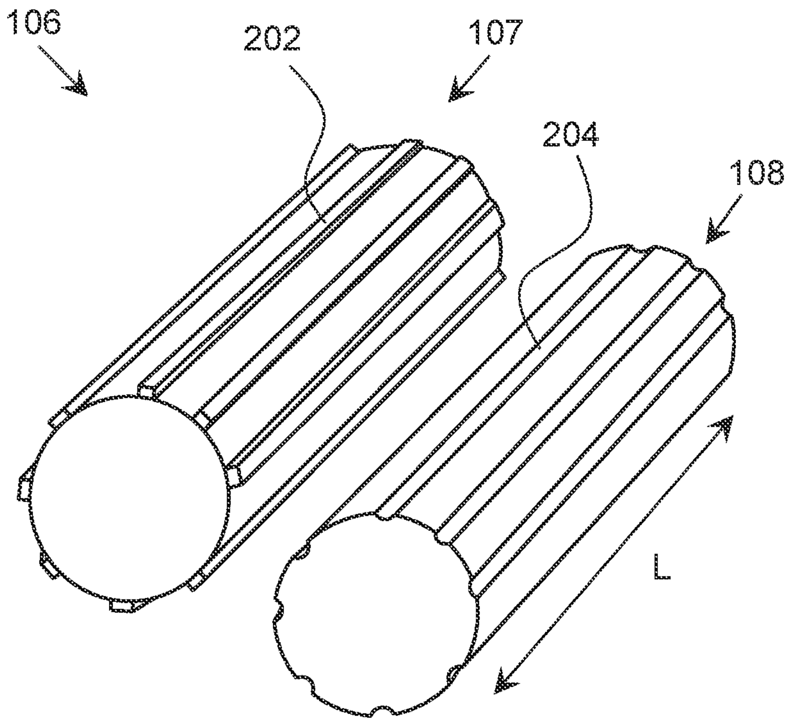
FIG. 2A illustrates perspective views of a first embossing roller and a second embossing roller, in accordance with an embodiment of the present invention.

FIG. 2A illustrates perspective views of the first embossing roller 107 and the second embossing roller 108, in accordance with an embodiment of the present invention. The first embossing roller 107 includes a plurality of protrusions 202. Further, the second embossing roller 108 includes a plurality of cavities 204 complementary to the plurality of protrusions 202. As the one or more first layers 105 are made to pass between the plurality of protrusions 202 and the plurality of cavities 204, pressure is applied to the one or more first layers 105 due to close clearance between the first embossing roller 107 and the second embossing roller 108. The one or more first layers 105 yield to the pressure and are plastically deformed to take a shape of a pattern defined by the plurality of protrusions 202 and the plurality of cavities 204. Therefore, a plurality of impressions is embossed upon the one or more first layers 105. The plurality of impressions may include but is not limited to bubble-like impressions, corrugated impressions, or impressions of any other predefined three-dimensional profile. Further, as illustrated in FIG. 2A, the plurality of protrusions 202 and the plurality of cavities 204 have been provided in longitudinal direction (L) along respective lengths of the first embossing roller 107 and the second embossing roller 108, respectively.

Figure 2B:
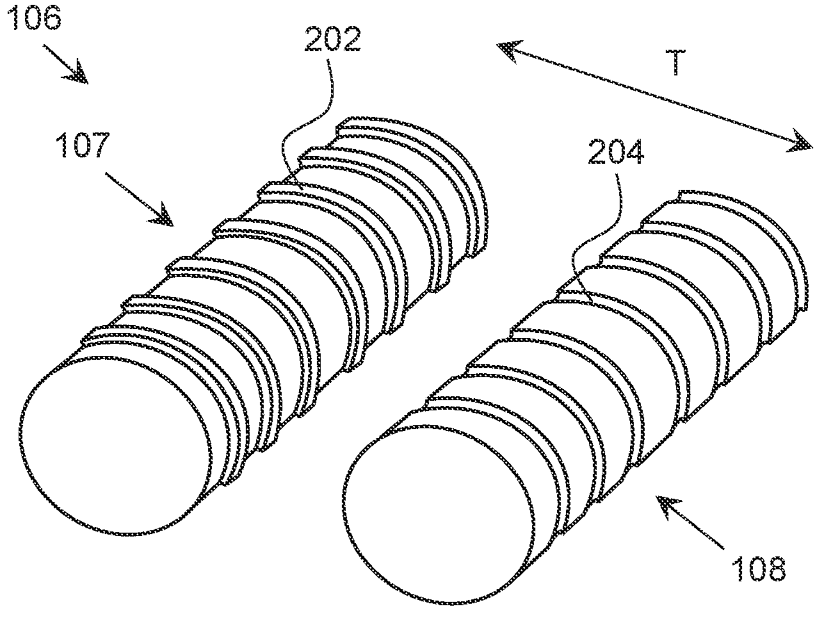
FIG. 2B illustrates perspective views of the first embossing roller and the second embossing roller, in accordance with another embodiment of the present invention.

FIG. 2B illustrates perspective views of the first embossing roller 107 and the second embossing roller 108, in accordance with another embodiment of the present invention. As illustrated in FIG. 2B, the plurality of protrusions 202 and the complementary plurality of cavities 204 have been provided in a transverse direction (T) along respective circumferences of the first embossing roller 107 and the second embossing roller 108, respectively. In several embodiments of the invention, shapes of the plurality of protrusions 202 and the plurality of cavities 204 may be selected from a group consisting of a square, a hexagon, a triangle, and an oval. Further, in several embodiments of the invention, respective heights of the plurality of protrusions 202 may lie between 0.5 mm to 11 mm. In an embodiment of the invention, a height of each one of the plurality of protrusions 202 is about 3 mm, considering the manufacturing tolerances, surface finish, and limits of the machinery deployed in the manufacturing of the first embossing roller 107 and the second embossing roller 108.

Figure 2C:
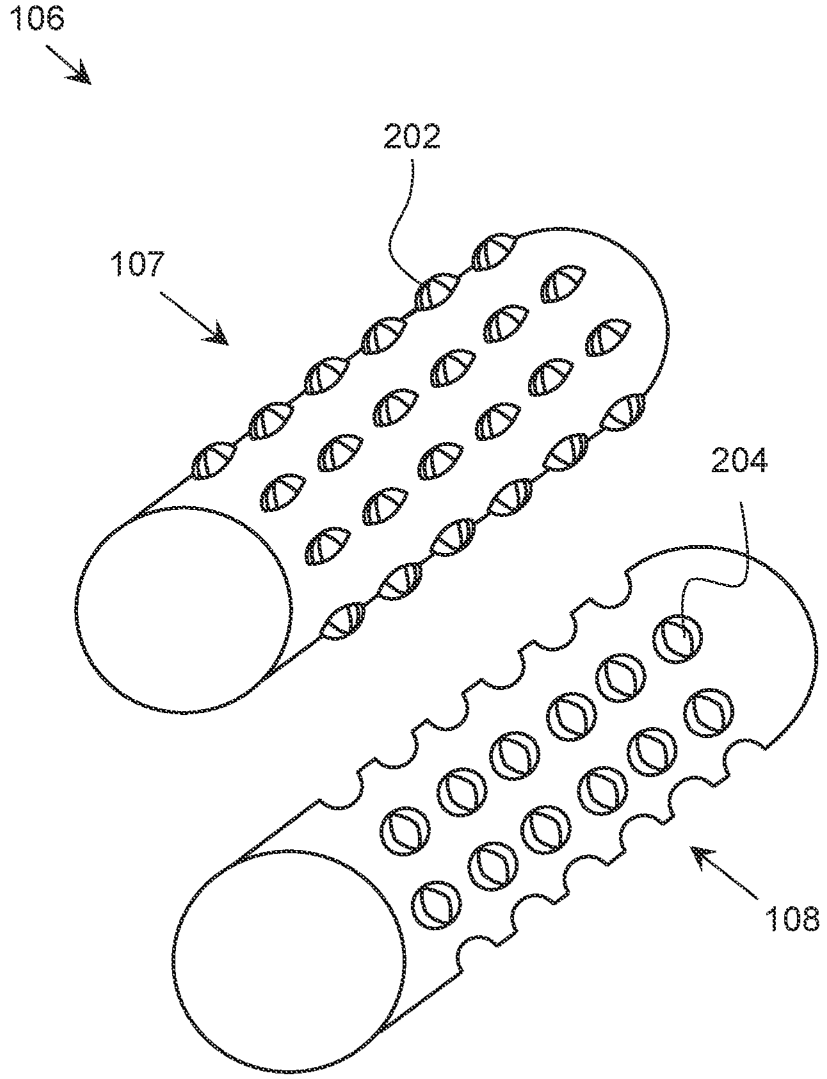
FIG. 2C illustrates perspective views of the first embossing roller and the second embossing roller, in accordance with another embodiment of the present invention.

FIG. 2C illustrates perspective views of the first embossing roller 107 and the second embossing roller 108, in accordance with another embodiment of the present invention. The plurality of protrusions 202 and the plurality of cavities 204 have been depicted have oval cross-sections. The oval cross-sections have imparted the plurality of protrusions 202 and the plurality of cavities 204 with dome-like cross-sections. The oval shape of the cross-sections produces a bubble-like embossing, or a horizontal or a vertical continuous dome along a length of the first embossing roller 107, or along a circumference of the first embossing roller 107. The bubble-like embossing or the continuous dome may further be adapted to be received in complementary cavities 204 of the second embossing roller 108, thereby producing a corrugated-like embossing onto the one or more first layers.

Referring to FIG. 1, the embossing module 106 is further configured to feed the embossed one or more first layers 105 to the adhesive coating module 110. The adhesive coating module 110 in that regard is configured to apply an adhesive to an outermost surface of the embossed one or more first layers 105. Further, the adhesive coating module 110 is configured to apply the adhesive to an inner surface of the second layer 109. The adhesive coating module 110 may include an adhesive applicator nozzle 112. However, alternatively, the adhesive coating module 110 may include applicator wheels and/or discs. More modern methods of application of adhesives include the use of spray nozzles and electromagnetically operated nozzles. With the use of spray and electromagnetically operated nozzles there is relatively minimal splashing and premature drying is also minimized. Therefore, during the recycling of the packaging receptacles, the adhesive can be easily removed. A technique for the application of the adhesives may be selected from a group consisting of spot application, line application, laid down application, and full coverage application through spraying.

In several embodiments of the invention, the adhesive may be selected from a group consisting of water-based adhesives, hot-melt adhesives, and cold-seal adhesives. The water-based adhesives are easy to dissolve in water at room temperature and therefore are desirable to increase the recyclability of the packaging material of the receptacles Similarly, the hot-melt adhesives exhibit relatively higher cohesion at room temperatures and are easy to separate, through processes such as centrifugation, during the recycling of the packaging material of the receptacles. In several embodiments of the invention, the modular apparatus 100 further includes a layer-sealing module 114. The layer-sealing module 114 includes a plurality of sealing implements 116 configured to seal the embossed one or more first layers 105 with the second layer 109, thereby generating a layer of a first packaging material 117. The plurality of sealing implements 116 is envisaged to operate at room temperature and seal the embossed one or more first layers 105 with the second layer 109 through the application of pressure. In several embodiments of the invention, the plurality of sealing implements 116 may include a pair of platens or discs between which the one or more first layers 105 and the second layer 109 may be located. The pressure may act on the adhesive applied between the outermost surface of the one or more first layers 105 and the second layer 109, thereby sealing the one or more first layers 105 with the second layer 109 and generating the layer of the first packaging material 117.

Figure 3:
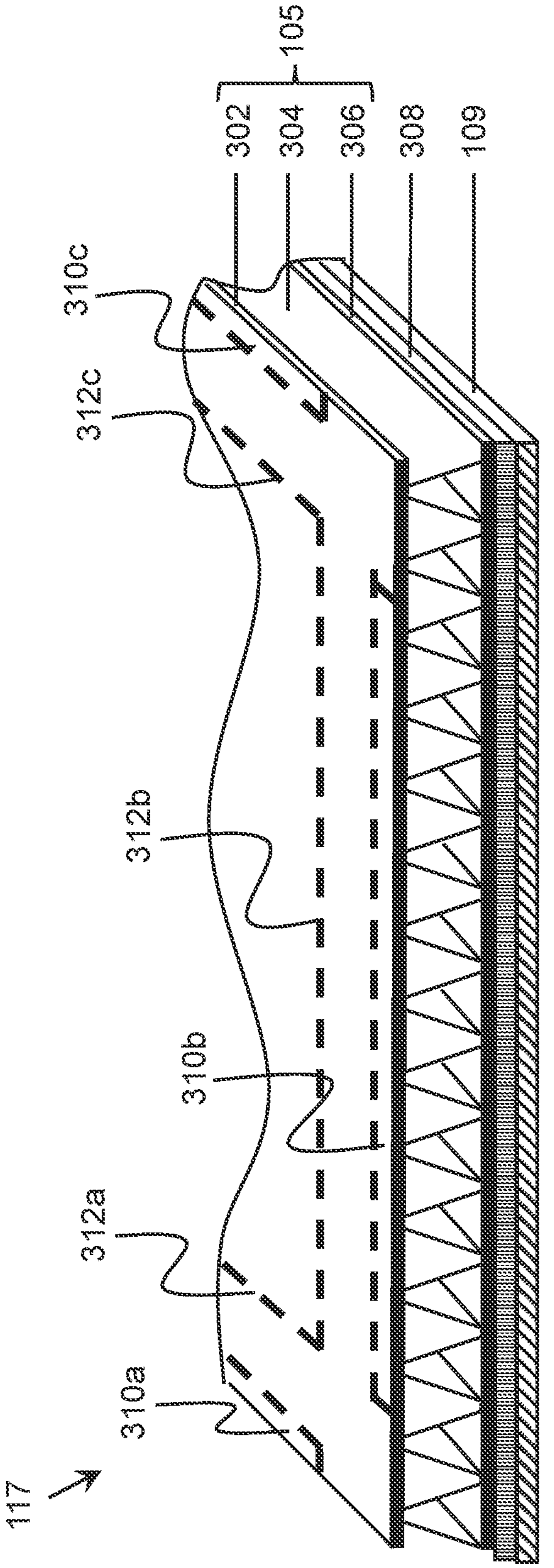
FIG. 3 illustrates a perspective view of a segment of a layer of a first packaging material, in accordance with an embodiment of the present invention.

FIG. 3 illustrates a perspective view of a segment of the layer of the first packaging material 117, in accordance with an embodiment of the present invention. The layer of the first packaging material 117 includes a corrugated layer 304 made from paper with a plurality of corrugations embossed thereupon as the plurality of impressions. Further, a first sealing layer 302 has been provided on a first side of the corrugated layer 304, and a second sealing layer 306 has been provided on a second side of the corrugated layer 304. In several alternate embodiments of the invention, only one of the first sealing layer 302 and the second sealing layer 306 may be provided. In several embodiments of the invention, none of the first sealing layer 302 and the second sealing layer 306 may be provided to the corrugated layer 304. The first sealing layer 302 and the second sealing layer 306 are also made up of paper. In the context of the layer of the first packaging material 117, the first sealing layer 302, the corrugated layer 304, and the second sealing layer 306 together constitute the embossed one or more first layers 105 which would act as the cushion layer of the layer of the first packaging material 117. Further, the second layer 109 would act as the outer layer of the first packaging material 117. An adhesive layer 308 has been applied between an outer surface of the second sealing layer 306 and the inner surface of the second layer 109. Further, adhesives may be applied on a plurality of bonding regions 310*a*, 310*b*, 310*c* that may be parallel to a plurality of fold lines 312*a*, 312*b*, 312*c*. In several non-limiting embodiments of the invention, the adhesive applied to the plurality of boding regions 310*a*, 310*b*, and 310*c* may be different from the adhesive applied to the outermost surface of the one or more first layers 105 and the inner surface of the second layer 109. For example, the adhesive applied to the plurality of bonding regions 310*a*, 310*b*, 310*c* may be a hot-melt adhesive, whereas, the adhesive applied to the outermost surface of the one or more first layers 105 and the inner surface of the second layer 109 may be a water-based adhesive.

Referring to FIG. 1, in one embodiment of the invention, the modular apparatus 100 further includes a folding module 118. The folding module 118 includes a plurality of folding implements 120 configured to fold the layer of the first packaging material 117 into a plurality of continuous predefined receptacles. For example, the predefined receptacles may be defined in the form of mailer envelopes and folded along the plurality of fold lines 312*a*, 312*b*, 312*c*. The plurality of folding implements 120 in that regard may include a plurality of autonomously operated arms. For example, the plurality of autonomous arms may be operated through hydraulic, pneumatic, and/or electrical actuators controlled by a controller. The controller may be a general-purpose processor, a microprocessor, a microcontroller, an Application Specific Integrated Circuit (ASIC), a Field Programmable Gate Array (FPGA), and the like. The plurality of folding implements 120 may also include friction feed paper folders that use friction wheels to push the paper into a folding structure. Further, the plurality of folding implements 120 may be configured to deploy buckle folding, knife folding, or a combination of the two folding methodologies. The plurality of folding implements 120 may also include a plurality of folding rollers configured to squeeze the first layer of the first packaging material 117 to complete the fold. The types of folds that may be created using the plurality of folding implements 120 include but are not limited to, letter folds (also referred to as C folds), accordion folds (also referred to as Z folds), half folds, fold-out, double parallel fold, gate (brochure) fold, and right angle fold.

In one embodiment of the invention, the modular apparatus 100 further includes a heated compression module 122. The heated compression module 122 may include a plurality of heated bars 124 to thermally seal a plurality of folded surfaces of the plurality of continuous predefined receptacles. For example, the plurality of folded surfaces may be folded along the plurality of fold lines 312*a*, 312*b*, 312*c* and the plurality of heated bars 124 may seal the plurality of folded surfaces by thermally curing the adhesive applied onto the plurality of bonding regions 310*a*, 310*b*, 310*c*. Further, adhesive strips may be deposited to sealing flaps of the plurality of continuous predefined receptacles and liner strip tapes may be provided on top of the respective adhesive strips. The modular apparatus 100 may further include a cutting module 126. The cutting module 126 may include a cutting blade 128 configured to cut the plurality of continuous predefined receptacles into a plurality of respective individual predefined receptacles 129 of a plurality of respective predefined sizes. In several alternate embodiments of the invention, the cutting module 126 may deploy heat straight cutting and/or heat zig-zag cutting as cutting implements. Alternately, the cutting module 126 may include die-cutting machines such as flatbed die-cutting machines or rotary die-cutting machines. The features, advantages, and limitations of die-cutting machines are well-known in the art and therefore are omitted for the sake of brevity. The modular apparatus 100 may further include a collating module (not shown) including a collating belt (not shown) configured to receive and deliver the plurality of individual predefined receptacles 129 such as the mailer envelopes.

The modular apparatus 100, as described above, is capable of manufacturing only one kind of packaging receptacle, where both the cushion layer and the outer layer are made from paper, such as kraft paper. Whereas, it may be desirable that in addition to manufacturing only the fully paper-based packaging receptacles, there may be an option of manufacturing partially or fully polymer-based receptacles through a multipurpose modular apparatus (See FIGS. 4A and 4B) that is capable of switching between several modes of operation with minimal reconfiguration and is capable of manufacturing packaging receptacles made from fully paper-based materials, partially paper/polymer-based materials and/or fully polymer-based materials.

The multipurpose modular apparatus is envisaged to be able to manufacture receptacles of multiple packaging materials. In that regard, the multipurpose modular apparatus is envisaged to include at least one non-identical production line in comparison to the modular apparatus 100. In several embodiments of the invention, the multipurpose modular apparatus may act in a dual mode where the multipurpose modular apparatus can manufacture packaging receptacles containing two kinds of polymer-based outer layers and a layer of polymer cushion material. Further, in several embodiments of the invention, the multipurpose modular apparatus may act in a triple mode where the multipurpose modular apparatus can manufacture packaging receptacles containing two kinds of polymer-based outer layers and a layer of polymer cushion material, and packaging receptacles containing a paper-based cushion layer and a paper-based outer layer as described through several embodiments of the modular apparatus 100.

Figure 4A:
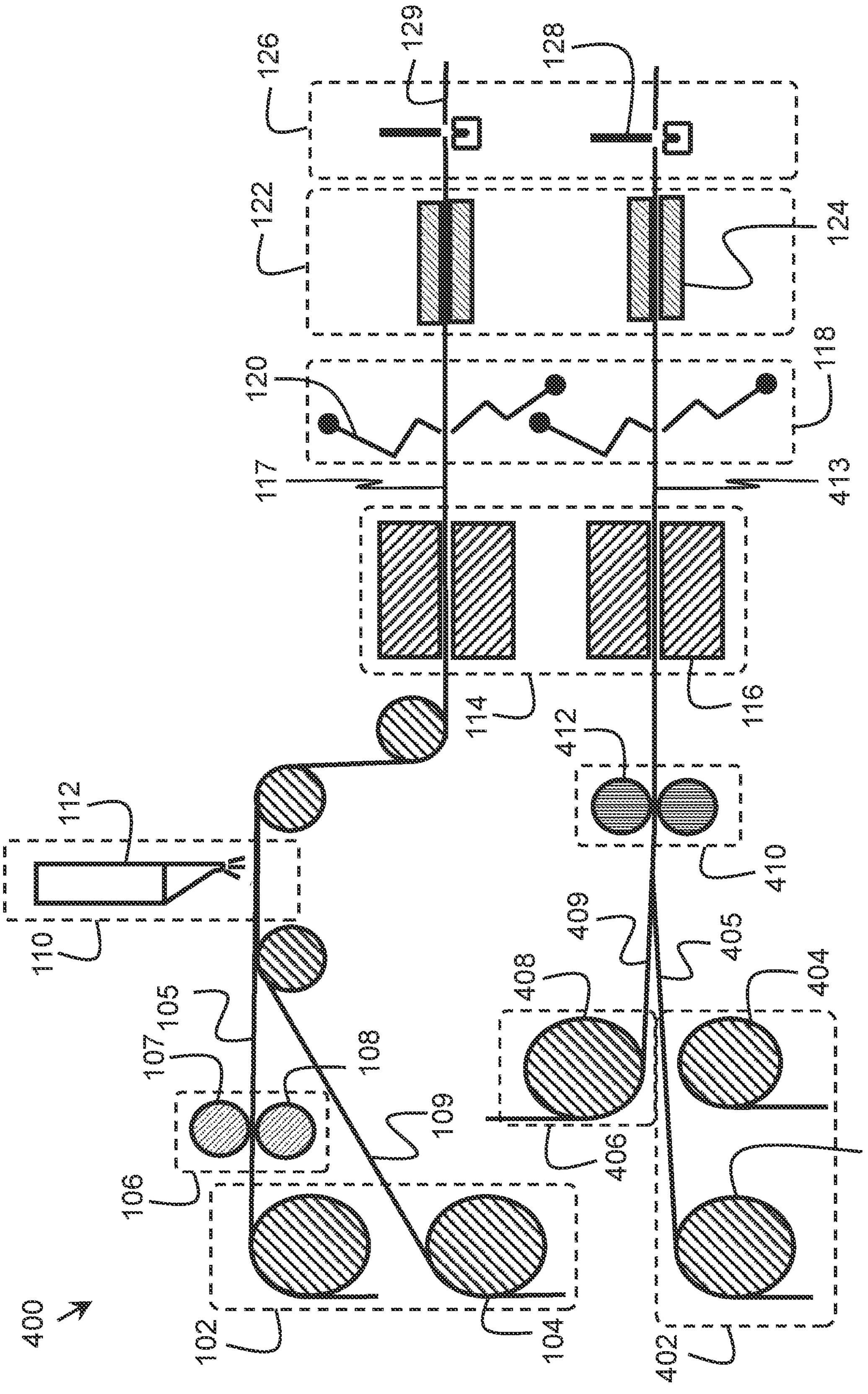
FIG. 4A illustrates a schematic diagram of a multipurpose modular apparatus for manufacturing the packaging receptacles, in accordance with an embodiment of the present invention.
Figure 4B:
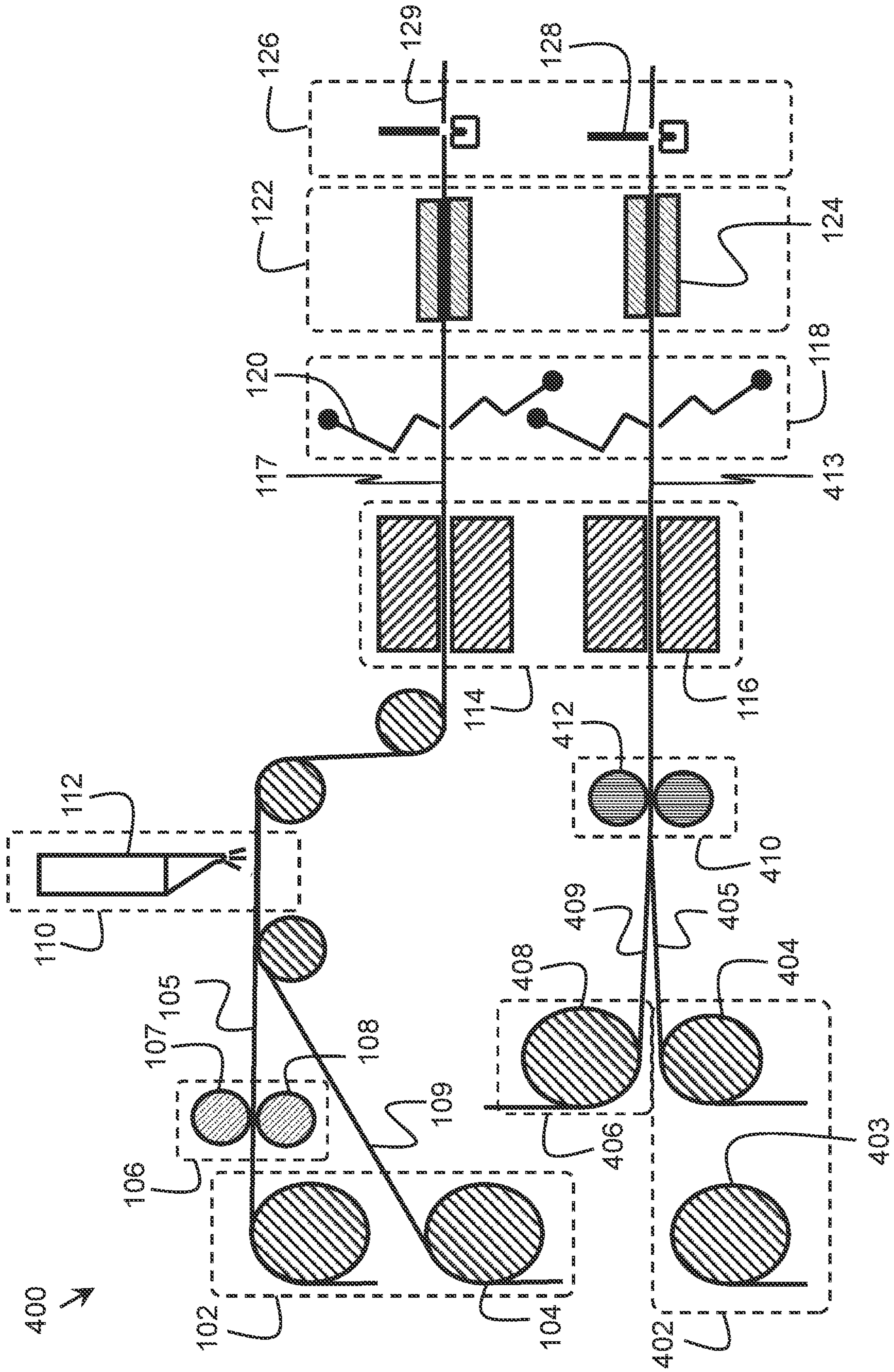
FIG. 4B illustrates a schematic diagram of the multipurpose apparatus for manufacturing the packaging receptacles, in accordance with another embodiment of the present invention.

FIG. 4A illustrates a schematic diagram of a multipurpose modular apparatus 400 for manufacturing the packaging receptacles, in accordance with an embodiment of the present invention. FIG. 4B illustrates a schematic diagram of the multipurpose apparatus 400 for manufacturing the packaging receptacles, in accordance with another embodiment of the present invention. The multipurpose modular apparatus 400, as illustrated in FIGS. 4A and 4B, have been presented to be of the triple mode design, wherein in a first mode the multipurpose modular apparatus 400 acts in a similar manner to the modular apparatus 100 utilizing the paper feeder module 102, the embossing module 106, the adhesive coating module 110, the layer-sealing module 114, the folding module 118, the heated compression module 122 and the cutting module 126, all of them also provided with the multipurpose modular apparatus 400. In a second and third mode, as will be discussed in the following discussion, the multipurpose modular apparatus 400 would utilize polymer-based materials to manufacture the packaging receptacles. However, without departing from the scope of the invention, the multipurpose modular apparatus 400 may be made to operate only in two modes by removing elements of any one of the first, the second, and the third mode, or may be made to operate in four or more modes by adding extra elements corresponding to the additional modes.

Further, FIGS. 4A and 4B illustrate a first feeder module 402. The first feeder module 402 includes a plurality of first feeder rollers 403, 404 configured to feed one or more layers of a polymer-based material 405 to a heat-sealing module 410. In several embodiments of the invention, the polymer-based material 405 is selected from a group consisting of opaque polymer materials and polymer-coated paper materials. A non-limiting example of an opaque polymer material includes opaque-colored coextruded polyethylene. A non-limiting example of polymer-coated paper materials includes polyethylene-coated kraft paper. In an example embodiment, at least one first feeder roller 403 of the plurality of first feeder rollers 403, 404 may be configured to feed the opaque polymer materials (as illustrated in FIG. 4A), and at least one other first feeder roller 404 of the plurality of first feeder rollers 403, 404 may be configured to feed the polymer-coated paper materials (as illustrated in FIG. 4B).

The multipurpose modular apparatus 400 further includes a polymer cushion feeder module 406. The polymer cushion feeder module 406 includes at least one polymer cushion material roller 408 configured to feed a layer of a polymer cushion material 408 to the heat-sealing module 410. In several embodiments of the invention, the polymer cushion material may include polyethylene-based air-bubble film sealed on one or both sides with a flat sealing layer of polyethylene. The multipurpose modular apparatus 400 further includes a heat-sealing module 410. The heat-sealing module 410 includes a heated-sealing roller set 412 configured to thermally seal the one or more layers of the polymer-based material 405 with the layer of the polymer cushion material 409 by fusing an outermost surface of the one or more layers of the polymer-based material 405 with an inner surface of the layer of the polymer cushion material 409. In one embodiment of the invention, the multipurpose modular apparatus 400 further includes the layer-sealing module 114. As discussed above, the layer-sealing module 114 includes the plurality of sealing implements 116. The plurality of sealing implements 116 is further configured to seal the one or more layers of the polymer-based material 405 with the layer of the polymer cushion material 409, thereby generating a layer of a second packaging material 413.

Figure 5A:
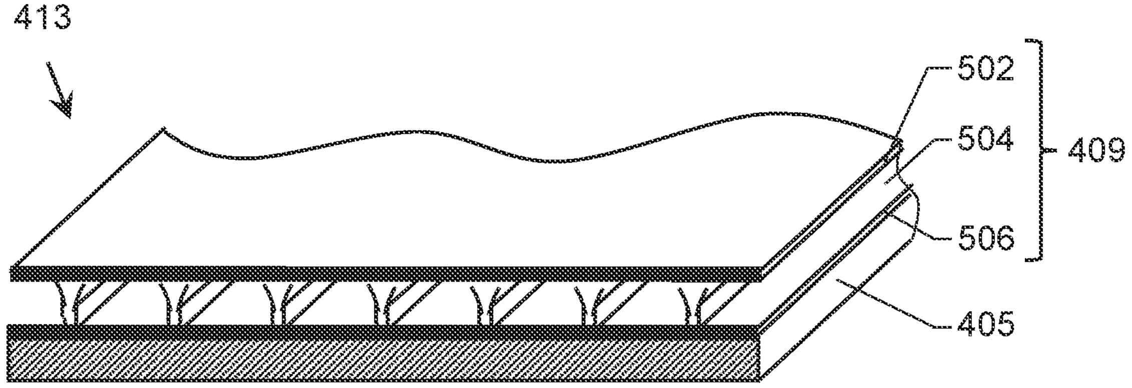
FIG. 5A illustrates a perspective view of a segment of the layer of a second packaging material, in accordance with an embodiment of the present invention.
Figure 5B:
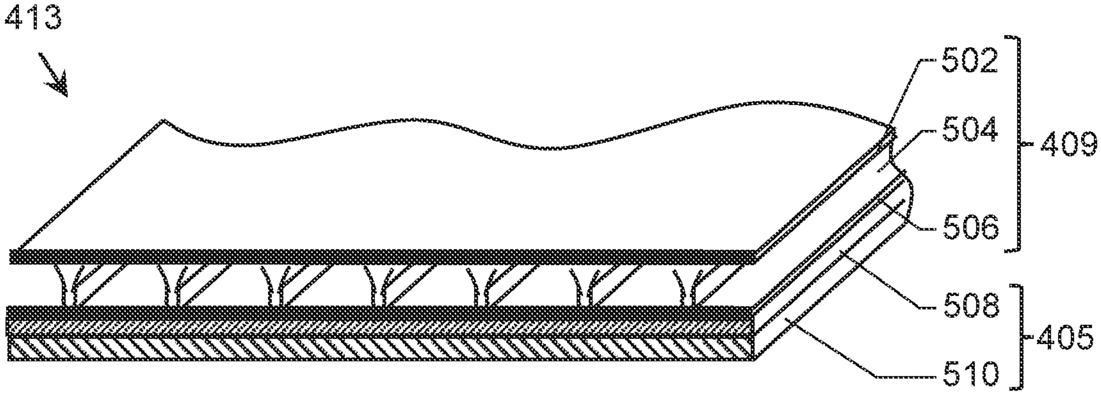
FIG. 5B illustrates a perspective view of the segment of the layer of the second packaging material, in accordance with another embodiment of the present invention

FIG. 5A illustrates a perspective view of a segment of the layer of the second packaging material 413, in accordance with an embodiment of the present invention. The layer of the polymer cushion material 409 includes a first sealing layer 502, a second sealing layer 506, and a vacuum-formed air bubble layer 504 in between the first sealing layer 502 and the second sealing layer 506. In several alternate embodiments of the invention, the layer of the polymer cushion material 409 may include only one of the first sealing layer 502 and the second sealing layer 506. The one or more layers of the polymer-based material 405 include a layer of the opaque polymer material. FIG. 5B illustrates a perspective view of the segment of the layer of the second packaging material 413, in accordance with another embodiment of the present invention. The layer of the polymer cushion material 409 includes the first sealing layer 502, the second sealing layer 506, and the vacuum-formed air bubble layer 504 in between the first sealing layer 502 and the second sealing layer 506. The one or more layers of the polymer-based material 405 include a layer of paper 510 coated with a layer of a polymer material 508.

In the context of the layer of the second packaging material 413, the one or more layers of the polymer-based material 405 act as the outer layer, and the layer of the polymer cushion material 409 acts as the cushion layer. Since both the one or more layers of the polymer-based material 405, and the layer of the polymer cushion material 409 include fusible polymers, the fusible polymers melt and amalgamate with each other to generate the layer of the second packaging material 413. It is to be noted here that in a production line including purely paper-based constituent materials, the heat-sealing module 410 is kept in OFF mode and bypassed. Whereas, in a production line including the polymer-based material 405 (purely polymer or polymer-coated paper), the embossing module 106 is bypassed.

Referring to FIGS. 4A and 4B, the multipurpose modular apparatus 400 further includes the folding module 118. The folding module 118 includes the plurality of folding implements 120. The plurality of folding implements 120 is configured to fold the layer of the second packaging material 413 into a plurality of continuous predefined receptacles. The multipurpose modular apparatus 400 further includes the heated compression module 122. The heated compression module 122 includes the plurality of heated bars 124. The plurality of heated bars 124 is configured to thermally seal a plurality of folded surfaces of the plurality of continuous predefined receptacles. The multipurpose modular apparatus 400 further includes the cutting module 126. The cutting module 126 is configured to cut the plurality of continuous predefined receptacles into a plurality of respective individual predefined receptacles 129 of a plurality of respective predefined sizes. The multipurpose modular apparatus 400 may further include the collating module including the collating belt configured to receive and deliver the plurality of individual predefined receptacles 129 such as mailer envelopes.

Figure 6:
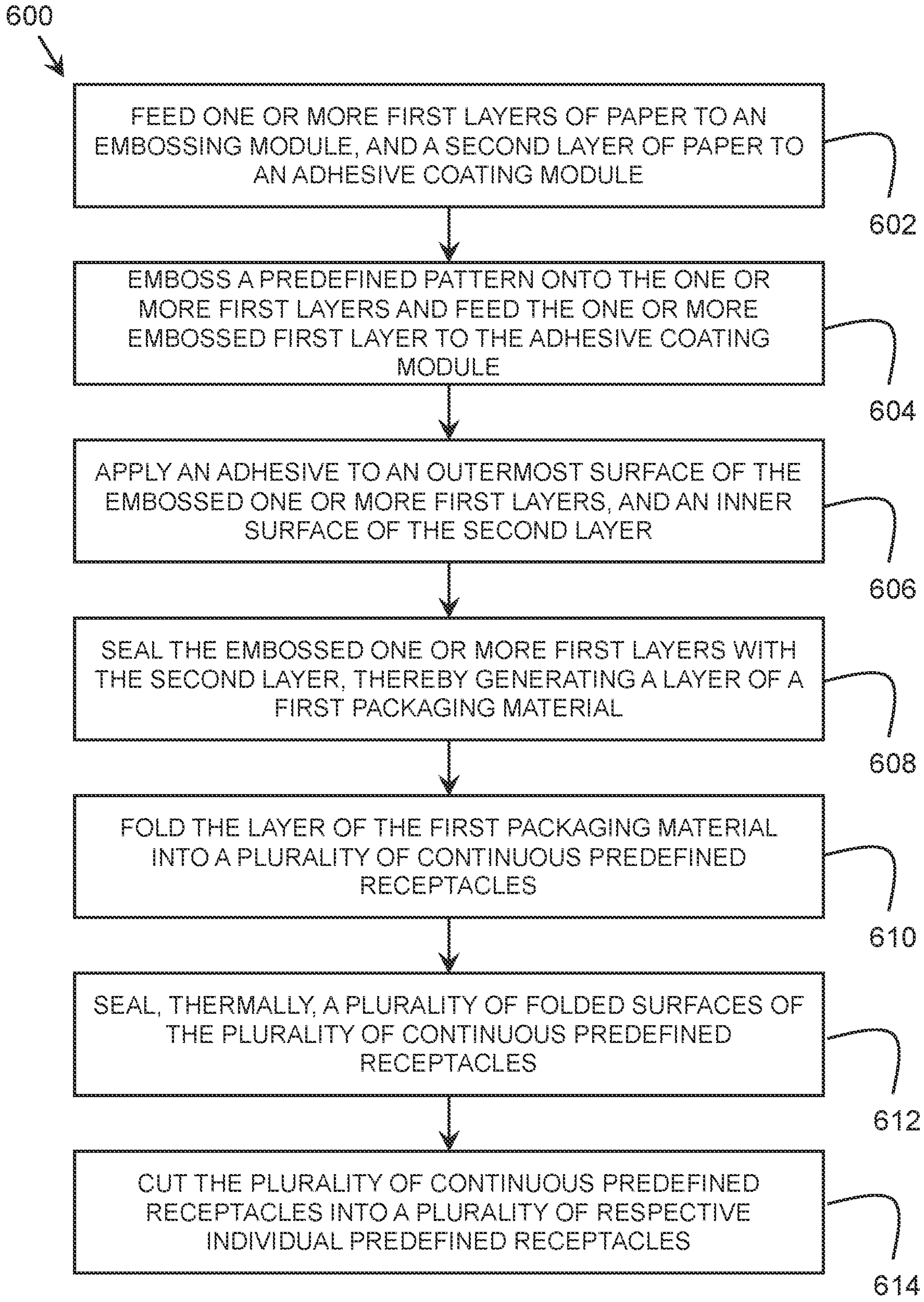
FIG. 6 illustrates a method of manufacturing the packaging receptacles in accordance with an embodiment of the present invention.

FIG. 6 illustrates a method 600 of manufacturing the packaging receptacles in accordance with an embodiment of the present invention. The method 600 begins at Step 602, when the one or more first layers 105 of paper are fed to the embossing module 106, by the plurality of paper feeder rollers 104 of the paper feeder module 102. Further, the second layer 109 is fed to the adhesive coating module 110. At Step 604, the first embossing roller 107 and the second embossing roller 108 emboss the plurality of impressions onto the one or more first layers 105 by passing the one or more first layers 105 between the first embossing roller 107 and the second embossing roller 108. Further, the first embossing roller 107 and the second embossing roller 108 feed the embossed one or more first layers 105 to the adhesive coating module 110. At Step 606, the adhesive coating module 110 applies the adhesive to the outermost surface of the embossed one or more first layers 105, and the inner surface of the second layer 109. The adhesive may be selected from a group consisting of water-based adhesives, hot-melt adhesives, and cold-seal adhesives. Further, the technique for the application of the adhesive may be selected from a group consisting of spot application, line application, laid down application, and full coverage application through spraying.

At Step 608, the plurality of sealing implements 116 of the layer-sealing module 114 seals the embossed one or more first layers 105 with the second layer 109, thereby generating the layer of the first packaging material 117. At Step 610, the plurality of folding implements 120 of the folding module 118 folds the layer of the first packaging material 117 into a plurality of continuous predefined receptacles. At Step 612, the plurality of heated bars 124 of the heated compression module 122 thermally seal the plurality of folded surfaces of the plurality of continuous predefined receptacles. At Step 614, the cutting module 126 cuts the plurality of continuous predefined receptacles into a plurality of respective individual predefined receptacles 129 of a plurality of respective predefined sizes.

Figure 7:
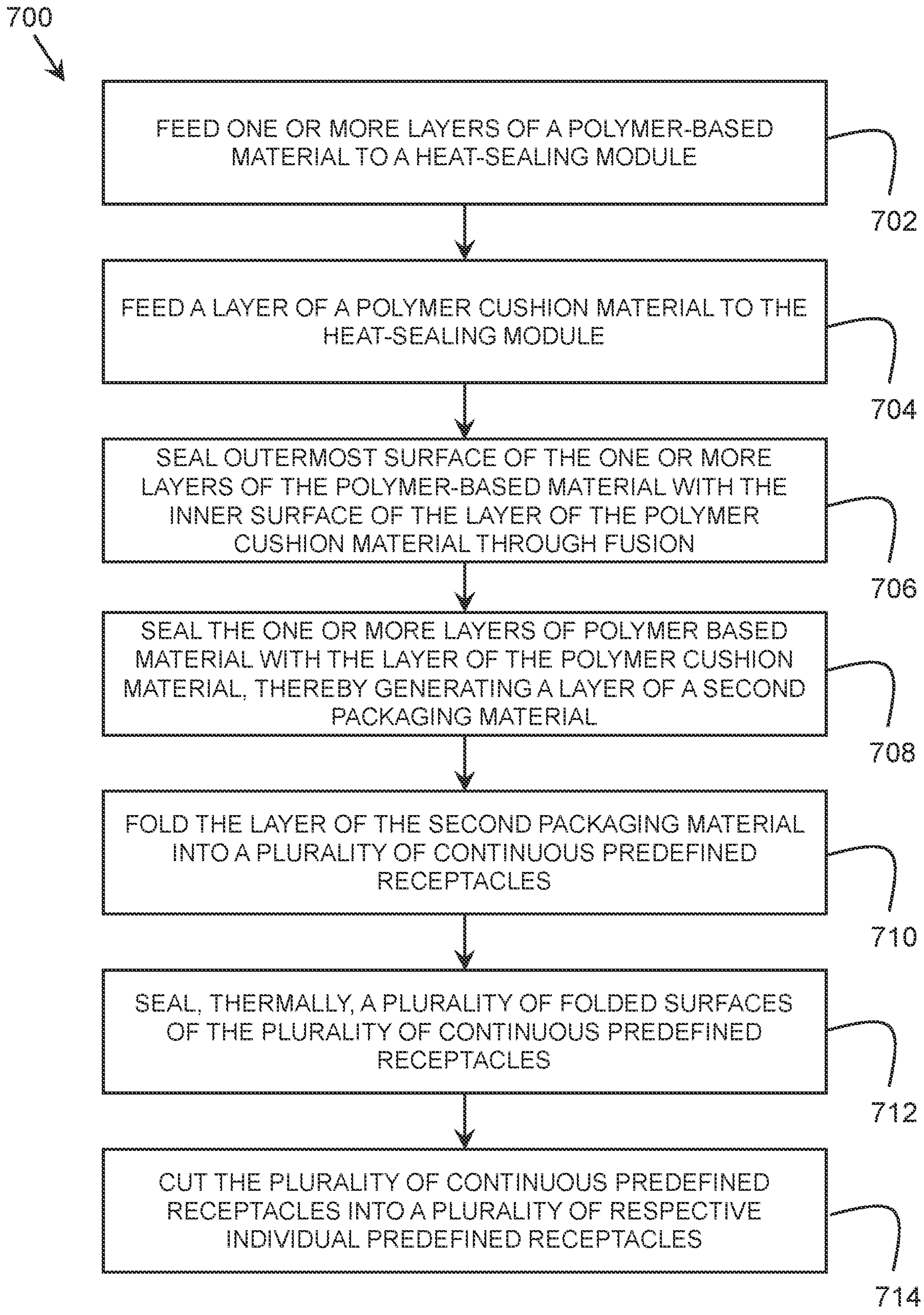
FIG. 7 illustrates the method of manufacturing the packaging receptacles in accordance with another embodiment of the present invention.

FIG. 7 illustrates a method 700 of manufacturing the packaging receptacles in accordance with another embodiment of the present invention. The method 700 begins at Step 702, when the plurality of first feeder rollers 403, 404 of the first feeder module 402 feed the one or more layers of the polymer-based material 405 to the heat-sealing module 410. At Step 704, the at least one polymer cushion material roller 408 of the polymer cushion feeder module 406, feeds the layer of the polymer cushion material 409 to the heat-sealing module 410. At Step 706, the heated-sealing roller set 412 of the heat-sealing module 410, seals the one or more layers of the polymer-based material 405 with the layer of the polymer cushion material 409, by fusing an outermost surface of the one or more layers of the polymer-based material 405 with an inner surface of the layer of the polymer cushion material 409.

At Step 708, the plurality of sealing implements 116 of the layer-sealing module 114 seals the one or more layers of the polymer-based material 405 with the layer of the polymer cushion material 409, thereby generating the layer of the second packaging material 413. At Step 710, the plurality of folding implements 120 of the folding module 118, folds the layer of the second packaging material 413 into a plurality of continuous predefined receptacles. At Step 712, the plurality of heated bars 124 of the heated compression module 122 seal therein, the plurality of folded surfaces of the plurality of continuous predefined receptacles. At Step 714, the cutting module 126 cuts the plurality of continuous predefined receptacles into a plurality of respective individual predefined receptacles 129 of a plurality of respective predefined sizes.

Figure 8A:
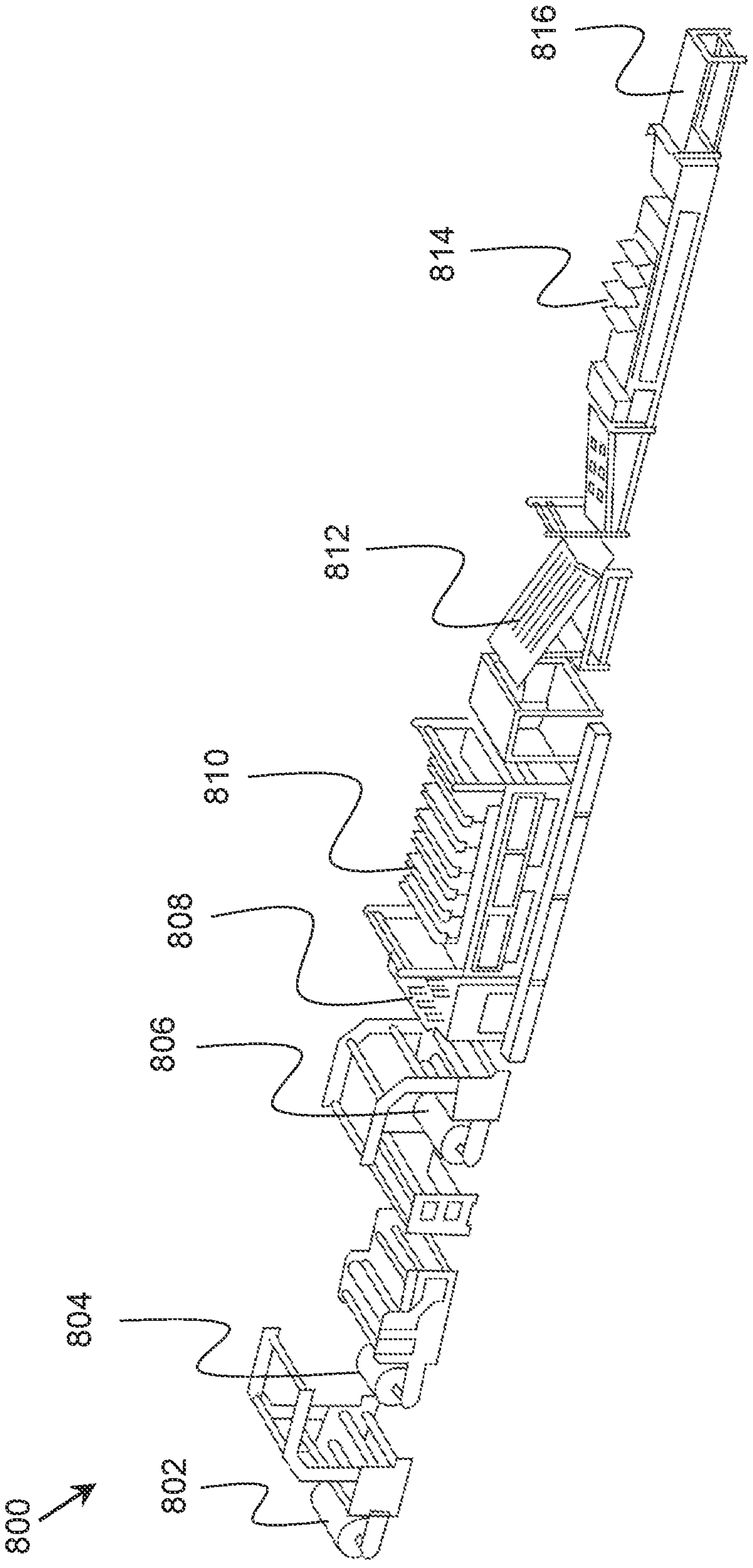
FIG. 8A illustrates an industrial implementation of the multipurpose modular apparatus, in accordance with an embodiment of the present invention.
Figure 8B:
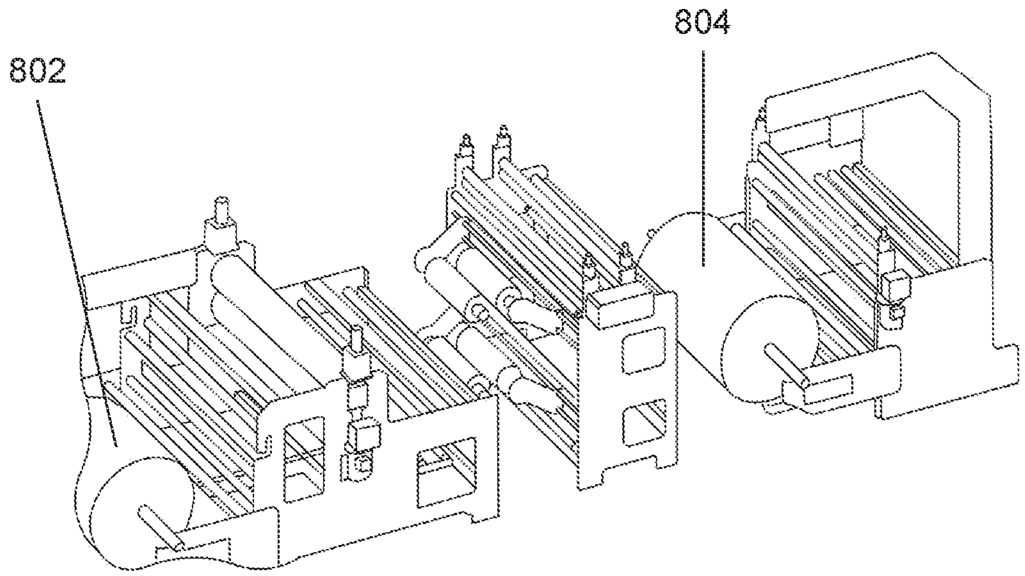
FIG. 8B illustrates a magnified view of a polymer cushion material roller and an opaque polymer material roller of the industrial implementation of FIG. 8A.

FIG. 8A illustrates an industrial implementation 800 of the multipurpose modular apparatus 400, in accordance with an embodiment of the present invention. The industrial implementation 800 includes a polymer cushion material roller 802, an opaque polymer feeder roller 804, and a paper feeder roller 806. The opaque polymer feeder roller 804 is configured to feed a layer of an opaque polymer material to a heat-sealing module (not shown). Further, the implementation 800 includes an adhesive coating module 808 configured to apply adhesive to an outermost surface of a paper-based cushion layer and an inner surface of a paper-based outer layer. Further illustrated is a layer-sealing module 810 configured to seal cushion layers of paper or polymer with outer layers of polymer, pure paper, or polymer coated paper. A folding module 812 is configured to fold layers of packaging materials into a plurality of continuous receptacles. A cutting module 814 is configured to cut the plurality of continuous receptacles into a plurality of individually separated receptacles that are then collected by a collating module 816. FIG. 8B illustrates a magnified view of the polymer cushion material roller 802 and the opaque polymer feed roller 804 of the industrial implementation 800 of FIG. 8A.

Figure 8C:
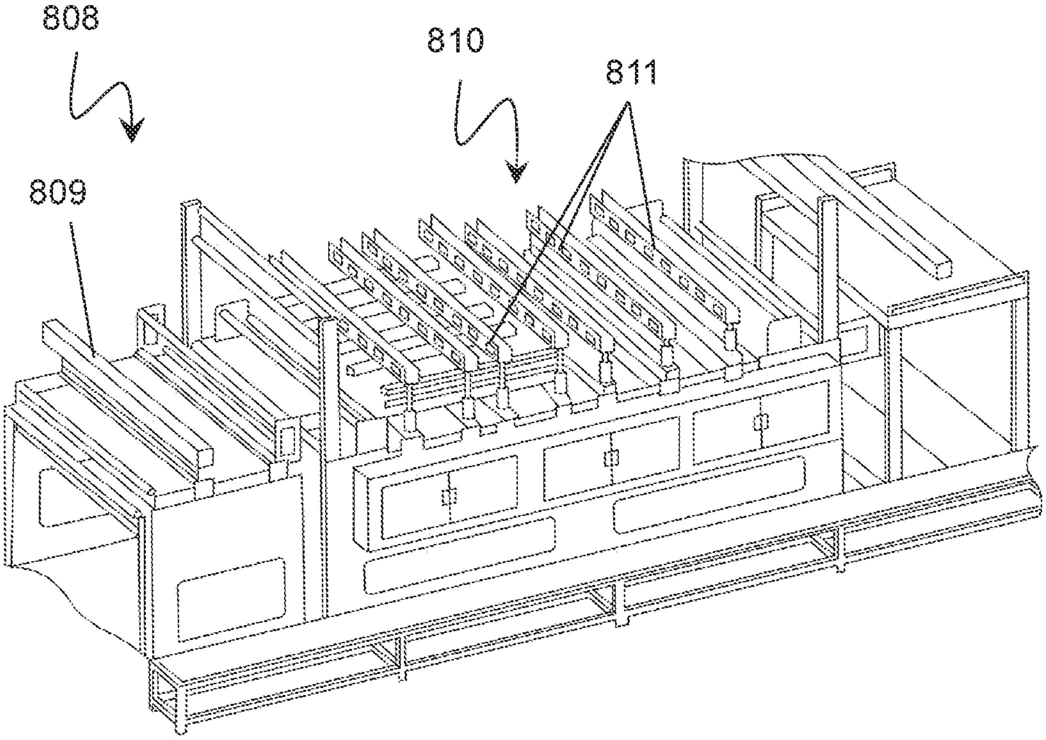
FIG. 8C illustrates a magnified view of an adhesive coating module and a layer-sealing module of the industrial implementation of FIG. 8A.
Figure 8D:
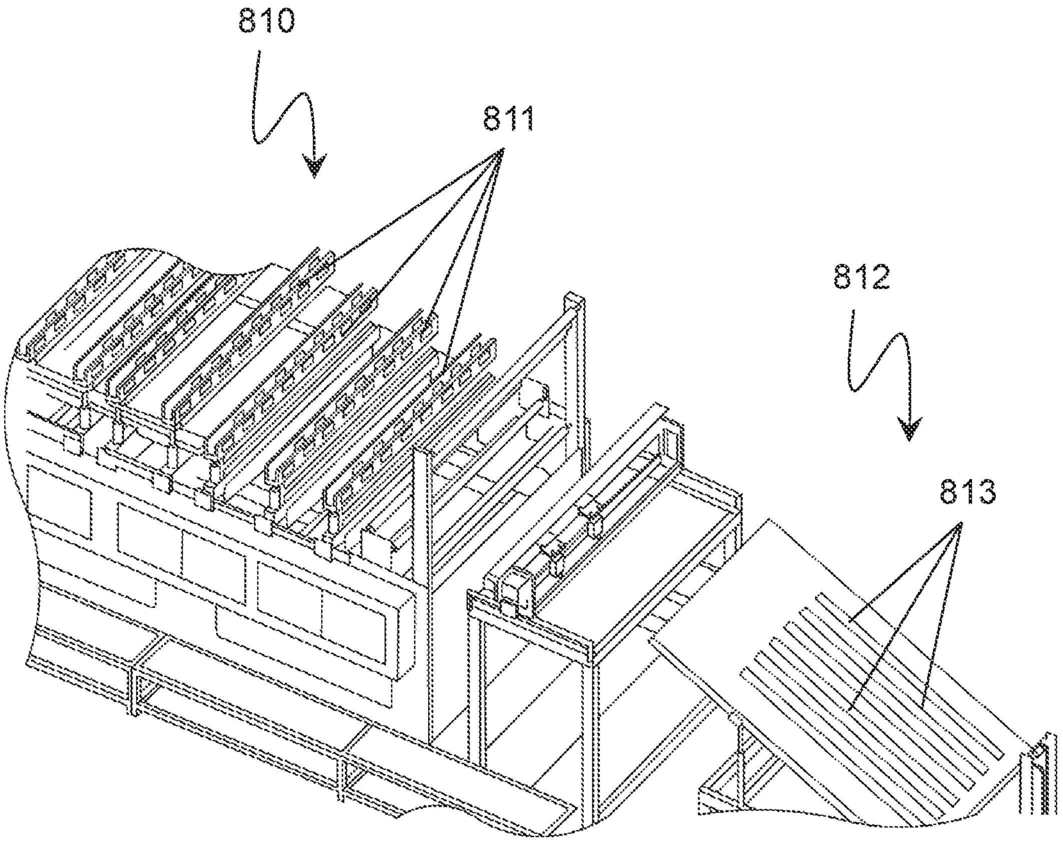
FIG. 8D illustrates a magnified view of the layer-sealing module and a folding module of the industrial implementation of FIG. 8A.

FIG. 8C illustrates a magnified view of the adhesive coating module 808 and the layer-sealing module 810 of the industrial implementation 800 of FIG. 8A. The adhesive coating module 808 includes adhesive applicator mechanisms 809 such as nozzles, discs, and/or wheels. The layer-sealing module 810 includes a plurality of sealing implements 811 configured to seal the cushion layers with the outer layers. The plurality of sealing implements 811 may include a plurality of platens or discs. FIG. 8D illustrates a magnified view of the layer-sealing module 810 and the folding module 812 of the industrial implementation 800 of FIG. 8A. The folding module 812 is envisaged to include a plurality of folding implements 813 such as a plurality of autonomously operated arms.

The invention described above through several embodiments offers several beneficial effects and advantages. For instance, the invention provides a new material for making packaging receptacles that uses paper alone for both the cushion layer and the outer layer. The use of paper alone makes the packaging receptacles environmentally friendly and enhances their recyclability. Also, the apparatus required for making the receptacles purely from paper is modular in design and construction, and therefore individual modular units of the apparatus can be retrofitted to the existing apparatuses that are used to manufacture polymer-based receptacles. Moreover, the apparatuses described above are modular in construction and allow switching between one set of raw materials to another set of raw materials with minimal reconfiguration. Moreover, in several embodiments of the apparatuses, a single configuration can be deployed to manufacture packages of varying constituent materials. Further, the width of the multipurpose modular apparatus may be increased up to eight feet thus doubling the production output when compared with typical four-foot apparatuses.

Various embodiments of the disclosure, as discussed above, may be practiced with steps and/or operations in a different order, and/or with hardware elements in configurations, which are different from those which are disclosed. Therefore, although the disclosure has been described based on these example embodiments, it is noted that certain modifications, variations, and alternative constructions may be apparent and well within the scope of the disclosure.

Although various example embodiments of the disclosure are described herein in a language specific to structural features and/or methodological acts, the subject matter defined in the appended claims is not necessarily limited to the specific features or acts described above. Rather, the specific features and acts described above are disclosed as example forms of implementing the claims.

The invention claimed is:

1. A modular apparatus for manufacturing packaging receptacles, the modular apparatus comprising:

a paper feeder module;

an embossing module; and an adhesive coating module;

wherein the paper feeder module comprises a plurality of paper feeder rollers configured to feed one or more first layers of a paper to the embossing module, and a second layer of the paper to the adhesive coating module, wherein the embossing module comprises a first embossing roller and a second embossing roller, the embossing module configured to emboss a plurality of impressions onto the one or more first layers by passing the one or more first layers between the first embossing roller and the second embossing roller, and feed the embossed one or more first layers to the adhesive coating module, and wherein the adhesive coating module is configured to apply an adhesive to an outermost surface of the embossed one or more first layers and an inner surface of the second layer.

2. The modular apparatus as claimed in claim 1, wherein the first embossing roller includes a plurality of protrusions, and the second embossing roller includes a plurality of cavities complementary to the plurality of respective protrusions.

3. The modular apparatus as claimed in claim 2, wherein shapes of the plurality of protrusions and the plurality of cavities are selected from a group consisting of a square, a hexagon, a triangle, and an oval.

4. The modular apparatus as claimed in claim 2, wherein respective heights of the plurality of protrusions lie between 0.5 mm and 11 mm.

5. The modular apparatus as claimed in claim 2, wherein a height of each one of the plurality of protrusions is about 3 mm.

6. The modular apparatus as claimed in claim 2, wherein the plurality of protrusions are provided in any one of a longitudinal direction along a length of the first embossing roller and a transverse direction along a circumference of the first embossing roller.

7. The modular apparatus as claimed in claim 1, further comprising:
a layer-sealing module;
a folding module;
a heated compression module; and
a cutting module,
wherein the layer-sealing module comprises a plurality of sealing implements configured to seal the embossed one or more first layers with the second layer, thereby generating a layer of a first packaging material;
wherein the folding module comprises a plurality of folding implements configured to fold the layer of the first packaging material into a plurality of continuous predefined receptacles,
wherein the heated compression module comprises a plurality of heated bars configured to thermally seal a plurality of folded surfaces of the plurality of continuous predefined receptacles, and
wherein the cutting module is configured to cut the plurality of continuous predefined receptacles into a plurality of respective individual predefined receptacles of a plurality of respective predefined sizes.

8. A multipurpose modular apparatus for manufacturing packaging receptacles, the multipurpose modular apparatus comprising:
a first feeder module;
a polymer cushion feeder module; and
a heat-sealing module;
wherein the first feeder module comprises a plurality of first feeder rollers configured to feed one or more layers of a polymer-based material to the heat-sealing module, wherein the polymer cushion feeder module comprises at least one polymer cushion material roller configured to feed a layer of a polymer cushion material to the heat-sealing module, and
wherein the heat-sealing module comprises a heated-sealing roller set configured to thermally seal the one or more layers of the polymer-based material with the layer of the polymer cushion material by fusing an outermost surface of the one or more layers of the polymer-based material with an inner surface of the layer of the polymer cushion material.

9. The multipurpose modular apparatus as claimed in claim 8, wherein the polymer-based material is selected from a group consisting of opaque polymer materials and polymer-coated paper materials.

10. The multipurpose modular apparatus as claimed in claim 8, further comprising:
a paper feeder module;
an embossing module;
an adhesive coating module; and
a layer-sealing module;
wherein the paper feeder module comprises a plurality of paper feeder rollers, the plurality of paper feeder rollers configured to feed one or more first layers of a paper to the embossing module, and a second layer of the paper to the adhesive coating module,
wherein the embossing module comprises a first embossing roller and a second embossing roller, the embossing module configured to emboss a plurality of impressions onto the one or more first layers by passing the one or more first layers between the first embossing roller and the second embossing roller, and feed the embossed one or more first layers to the adhesive coating module,
wherein the adhesive coating module is configured to apply an adhesive to an outermost surface of the embossed one or more first layers and an inner surface of the second layer, and
wherein the layer-sealing module comprises a plurality of sealing implements configured to seal the embossed one or more first layers with the second layer, thereby generating a layer of a first packaging material.

11. The multipurpose modular apparatus as claimed in claim 8, further comprising:
a layer-sealing module;
a folding module;
a heated compression module; and
a cutting module;
wherein the layer-sealing module comprises a plurality of sealing implements configured to seal the one or more layers of polymer-based material with the layer of the polymer cushion material, thereby generating a layer of a second packaging material,
wherein the folding module comprises a plurality of folding implements configured to fold the layer of the second packaging material into a plurality of continuous predefined receptacles,
wherein the heated compression module comprises a plurality of heated bars configured to thermally seal a plurality of folded surfaces of the plurality of continuous predefined receptacles, and
wherein the cutting module is configured to cut the plurality of continuous predefined receptacles into a plurality of respective individual predefined receptacles of a plurality of respective predefined sizes.

12. A multipurpose modular apparatus for manufacturing packaging receptacles, the multipurpose modular apparatus comprising:
a first feeder module;
a polymer cushion feeder module;
a heat-sealing module;
a paper feeder module;
an embossing module;
an adhesive coating module;
a layer-sealing module;
a folding module;
a heated compression module; and
a cutting module;
wherein the first feeder module comprises a plurality of first feeder rollers configured to feed one or more layers of a polymer-based material to the heat-sealing module,
wherein the polymer cushion feeder module comprises at least one polymer cushion material roller configured to feed a layer of a polymer cushion material to the heat-sealing module, po1 wherein the heat-sealing module comprises a heated-sealing roller set configured to thermally seal the one or more layers of the polymer-based material with the layer of the polymer cushion material by fusing an outermost surface of the one or more layers of the polymer-based material with an inner surface of the layer of the polymer cushion material,
wherein the paper feeder module comprises a plurality of paper feeder rollers, the plurality of paper feeder rollers configured to feed one or more first layers of a paper to the embossing module, and a second layer of the paper to the adhesive coating module,
wherein the embossing module comprises a first embossing roller and a second embossing roller, the embossing module configured to emboss a plurality of impressions onto the one or more first layers by passing the one or more first layers between the first embossing roller and the second embossing roller, and feed the embossed one or more first layers to the adhesive coating module, wherein the adhesive coating module is configured to apply an adhesive to an outermost surface of the embossed one or more first layers and an inner surface of the second layer, wherein the layer-sealing module comprises a plurality of sealing implements configured to seal the embossed one or more first layers with the second layer, thereby generating a layer of a first packaging material, and to seal the one or more layers of polymer-based material with the layer of the polymer cushion material, thereby generating a layer of a second packaging material, wherein the folding module comprises a plurality of folding implements configured to fold the layer of the first packaging material and the layer of the second packaging material into a plurality of continuous predefined receptacles, wherein the heated compression module comprises a plurality of heated bars configured to thermally seal a plurality of folded surfaces of the plurality of continuous predefined receptacles, and wherein the cutting module is configured to cut the plurality of continuous predefined receptacles into a plurality of respective individual predefined receptacles of a plurality of respective predefined sizes.

13. A method of manufacturing packaging receptacles, the method comprising:

feeding, by a plurality of paper feeder rollers of a paper feeder module, one or more first layers of a paper to an embossing module, and a second layer of the paper to an adhesive coating module;

embossing, by a first embossing roller and a second embossing roller of the embossing module, a plurality of impressions onto the one or more first layers, by passing the one or more first layers between the first embossing roller and the second embossing roller, and feeding the embossed one or more first layer to the adhesive coating module; and applying, by the adhesive coating module, an adhesive to an outermost surface of the embossed one or more first layers, and an inner surface of the second layer.

14. The method as claimed in claim 13, wherein the adhesive is selected from a group consisting of water-based adhesives, hot-melt adhesives, and cold-seal adhesives.

15. The method as claimed in claim 13, wherein a technique for the application of the adhesive is selected from a group consisting of spot application, line application, laid down application, and full coverage application through spraying.

16. The method as claimed in claim 13, further comprising:

sealing, by a plurality of sealing implements of a layer-sealing module, the embossed one or more first layers with the second layer, thereby generating a layer of a first packaging material;

folding, by a plurality of folding implements of a folding module, the layer of the first packaging material into a plurality of continuous predefined receptacles;

sealing, thermally, by a plurality of heated bars of a heated compression module, a plurality of folded surfaces of the plurality of continuous predefined receptacles; and cutting, by a cutting module, the plurality of continuous predefined receptacles into a plurality of respective individual predefined receptacles of a plurality of respective predefined sizes.

17. A method for manufacturing packaging receptacles, the method comprising:

feeding, by a plurality of first feeder rollers of a first feeder module, one or more layers of a polymer-based material to a heat-sealing module;

feeding, by at least one polymer cushion material roller of a polymer cushion feeder module, a layer of a polymer cushion material to the heat-sealing module; and sealing, by a heated-sealing roller set of the heat-sealing module, the one or more layers of the polymer-based material with the layer of the polymer cushion material, by fusing an outermost surface of the one or more layers of the polymer-based material with an inner surface of the layer of the polymer cushion material.

18. The method as claimed in claim 17, further comprising:

sealing, by a plurality of sealing implements of a layer-sealing module, the one or more layers of polymer-based material with the layer of the polymer cushion material, thereby generating a layer of a second packaging material;

folding, by a plurality of folding implements of a folding module, the layer of the second packaging material into a plurality of continuous predefined receptacles;

sealing, thermally, by a plurality of heated bars of a heated compression module, a plurality of folded surfaces of the plurality of continuous predefined receptacles; and cutting, by a cutting module, the plurality of continuous predefined receptacles into a plurality of respective individual predefined receptacles of a plurality of respective predefined sizes.

19. A layer of a packaging material, the layer comprising:

one or more first layers of paper with a plurality of impressions embossed thereupon; and a second layer of paper, wherein an outermost surface of the embossed one or more first layers is sealed with an inner surface of the second layer, through thermal curing of an adhesive applied between the outermost surface of the embossed one or more first layers, and the inner surface of the second layer.

20. The layer as claimed in claim 19, wherein a plurality of respective heights of the plurality of impressions lies between 0.5 mm and 11 mm.

* * * * *